J. AUSTINE.
Millers' Paint-Staff.

No. 196,414. Patented Oct. 23, 1877.

WITNESSES:
Edw. W. Byrn
Geo. D. Kernon

INVENTOR:
Jacob Austine
BY
ATTORNEYS.

UNITED STATES PATENT OFFICE.

JACOB AUSTINE, OF HUNTSVILLE, OHIO.

IMPROVEMENT IN MILLERS' PAINT-STAFFS.

Specification forming part of Letters Patent No. 196,414, dated October 23, 1877; application filed August 1, 1877.

*To all whom it may concern:*

Be it known that I, JACOB AUSTINE, of Huntsville, in the county of Logan and State of Ohio, have invented a new and Improved Miller's Paint-Staff; and I do hereby declare that the following is a full, clear, and exact description of the same, reference being had to the accompanying drawings, forming part of this specification, in which—

Figure 1:
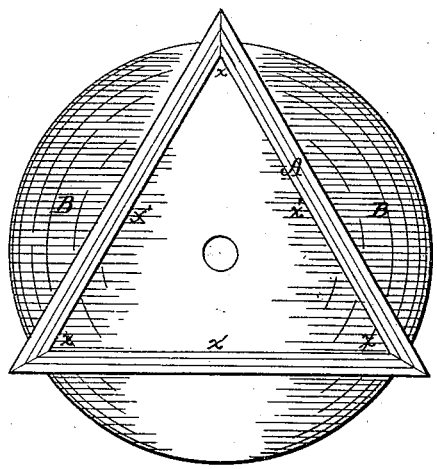
Figure 2:
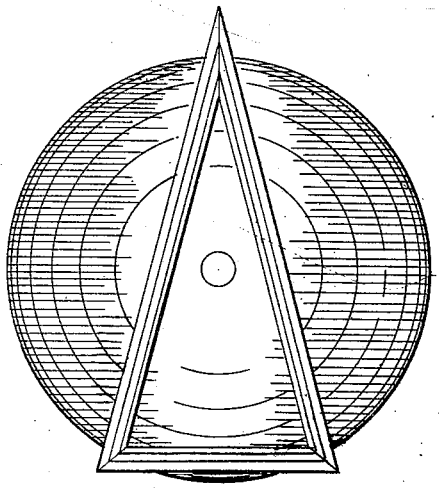

Figure 1 is a plan view of a millstone with the equilateral triangular staff applied thereto; Fig. 2, a similar view of a millstone with an old form of staff applied thereto.

In both these figures the parallel lines on the millstones indicate the high places thereon, which are the same in each figure, while the circular lines indicate the points touched by the two staffs in turning, which, in Fig. 1, are only the high places, while in Fig. 2 the points of contact are continued across the low as well as the high places.

My invention relates to an improved form of miller's paint-staff, or device for applying a color in a true plane to the face of a millstone, to detect and locate the high places when the stone is "in wind" or has uneven places, and thus permit the same to be trued up.

It consists in a staff made in the form of an equilateral triangle, for the purpose hereinafter described.

In the accompanying drawing, A represents the equilateral triangular staff, composed of three equal bars, united by any suitable means, with their faces in the same plane. When these bars are made of wood they are each made of several strips arranged edgewise or at right angles to the plane, and securely glued to prevent warping.

In making use of the staff the paint is applied to the face of the same, and the latter then turned concentrically with the eye of the burr. This movement, it will be seen, smears the paint upon the high places, as at B B, and thus enables the miller to locate and dress down these faces to a true plane.

I am aware of the fact that a triangular staff is not new, such a one being shown in the patent to Ransom, No. 161,155, (illustrated in Fig. 2;) but the narrow isosceles triangle here shown would not always rest upon the high place, for the reason that its length would sometimes rest between two high places on a stone when the latter is "in wind," as in Fig. 2, in which event the stone would be smeared all around upon the low as well as the high points, and the staff would indicate a true plane when the burr was not true.

With my equilateral triangular staff, it will be seen that its length and breadth are the same, and hence it presents an area that best conforms to the circular millstone, whose length and breadth are the same, so that while resting above the skirt at three equidistant points, $x$, it also approaches the eye at three equidistant points, $x'$, in true planes, and hence it always stands in the same relation to the uneven parts without following their curvature, and in moving in true planes always rests upon the high places for all parts of its revolution, and touches no other points.

In constructing my staff but one measurement of bar and one cut are used in connecting the same, and hence greater accuracy may be obtained in fitting the parts to form a true staff.

Having thus described my invention, what I claim as new is—

A miller's paint-staff made in the form of an equilateral triangle, with the faces of the same brought to a true plane, for the purpose described.

JACOB AUSTINE.

Witnesses:
   JOS. H. LAWRENCE,
   LEM. STEVENSON.